United States Patent
Wu

(10) Patent No.: US 8,907,635 B2
(45) Date of Patent: Dec. 9, 2014

(54) CHARGING CIRCUIT AND CHARGING METHOD EMPLOYING THE SAME

(75) Inventor: Fan Wu, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 851 days.

(21) Appl. No.: 13/045,536

(22) Filed: Mar. 11, 2011

(65) Prior Publication Data

US 2012/0146591 A1    Jun. 14, 2012

(30) Foreign Application Priority Data

Dec. 8, 2010  (CN) .......................... 2010 1 0578784

(51) Int. Cl.
*H02J 7/00* (2006.01)
*H02J 7/08* (2006.01)

(52) U.S. Cl.
CPC .............. *H02J 7/0077* (2013.01); *H02J 7/085* (2013.01); *H02J 7/008* (2013.01)
USPC ........................................................ 320/164

(58) Field of Classification Search
USPC ................... 320/158–159, 163–164
See application file for complete search history.

(56) References Cited

U.S. PATENT DOCUMENTS

| | | | |
|---|---|---|---|
| 6,771,042 B2 * | 8/2004 | Chen et al. ..................... | 320/110 |
| 6,859,016 B2 * | 2/2005 | Dotzler ......................... | 320/164 |
| 7,474,079 B2 * | 1/2009 | Hashimoto .................... | 320/138 |
| 8,085,001 B2 * | 12/2011 | Wang et al. .................... | 320/164 |
| 8,164,309 B2 * | 4/2012 | Li .................................. | 320/149 |
| 8,269,467 B2 * | 9/2012 | Li et al. ......................... | 320/153 |
| 2010/0188051 A1 * | 7/2010 | Yamazaki et al. ............ | 320/148 |

* cited by examiner

*Primary Examiner* — Samuel Berhanu
(74) *Attorney, Agent, or Firm* — Novak Druce Connolly Bove + Quigg LLP

(57) ABSTRACT

A charging circuit includes a transistor, a current regulating resistor, a field effect transistor (FET) and a main controller. The transistor includes an emitter, a base and a collector, the FET includes a source, a gate and a drain. The emitter is connected to the battery charger; the drain is connected to the battery. The main controller includes a current control unit, a charge control unit and a voltage detection unit. The current control unit transmits current signals to the base of the transistor to turn on the transistor and regulate the current values of the collector, the voltage detection unit detects the voltage of the battery and controls the charge control unit according to detection result, and the charge control unit sends a command signal to the gate to switch the FET on or off.

20 Claims, 2 Drawing Sheets

CHARGING CIRCUIT AND CHARGING METHOD EMPLOYING THE SAME

BACKGROUND

1. Technical Field

The disclosure generally relates to device charging, and more particularly to a charging circuit used in a portable electronic device and a charging method employing the charging circuit.

2. Description of the Related Art

When a rechargeable battery of a portable electronic device, such as a personal digital assistant (PDA) or mobile phone, is in an initial charging state by a battery charger, output voltage of the battery charger can be easily pulled down by the battery, falling below the operating voltage of the main microcontroller of the portable electronic device. Since the main microcontroller fails to achieve a predetermined operating voltage, the portable electronic device cannot boot normally, failing to realize required operability.

Therefore, there is room for improvement within the art.

BRIEF DESCRIPTION OF THE DRAWINGS

Many aspects of an exemplary charging circuit and charging method employing the same can be better understood with reference to the following drawings. The components in the drawings are not necessarily drawn to scale, the emphasis instead being placed upon clearly illustrating the principles of the exemplary charging circuit and charging method employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
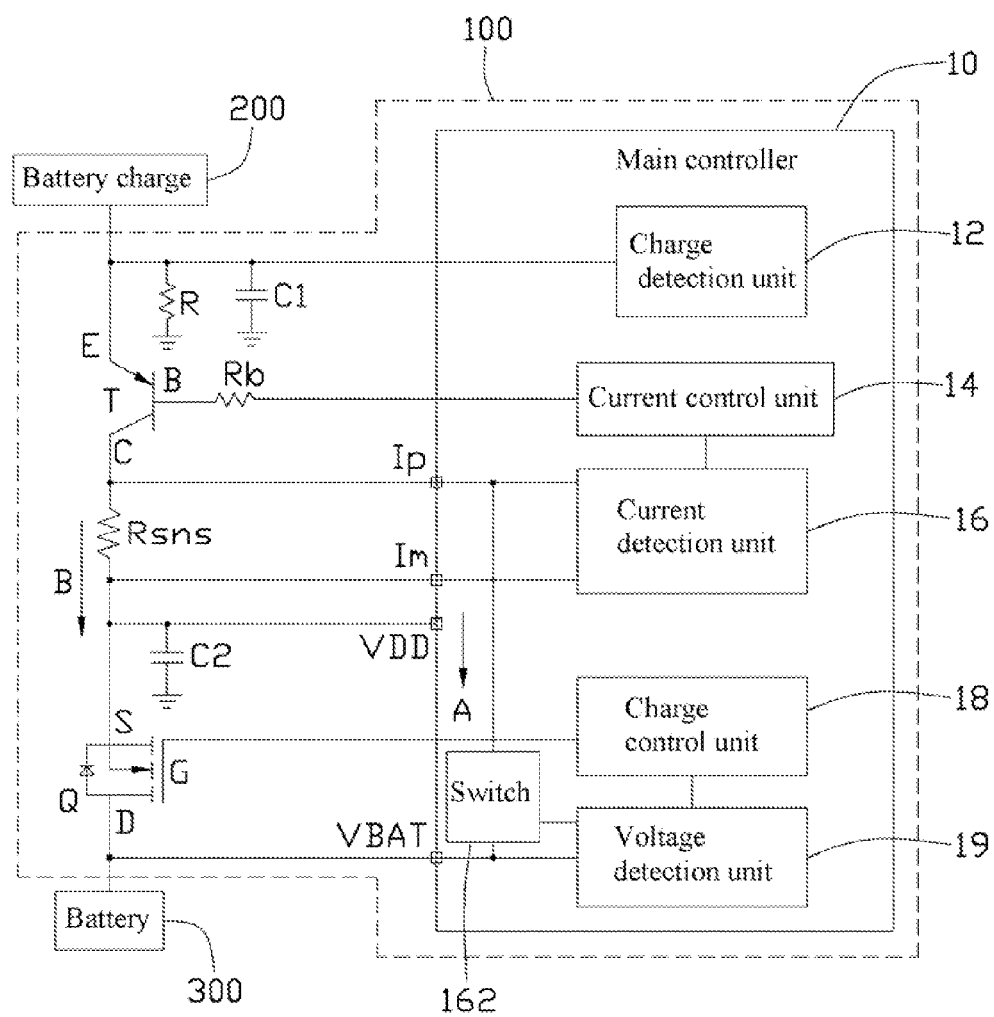
FIG. 1 is a circuit view of a charging circuit, according to an exemplary embodiment of the disclosure.

FIG. 1 shows a charging circuit 100, according to an exemplary embodiment of the disclosure. The charging circuit 100 can be employed in a mobile phone, a personal digital assistant (PDA), or other portable electronic device. The charging circuit 100 is electrically connected to a battery charger 200 and a battery 300, so the battery charger 200 can charge the battery 300 through the charging circuit 100.

The charging circuit 100 includes a main controller 10, a transistor T, a current regulating resistor Rb, two filter capacitors C1 and C2, a filter resistor R, a sampling resistor Rsns, and a field effect transistor (FET) Q. The main controller 10 is capable of running a boot program to start the electronic device, and controlling operations of the electronic device.

The main controller 10 includes a charge detection unit 12, a current control unit 14, a current detection unit 16, a switch 162, a charge control unit 18, and a voltage detection unit 19. The main controller 10 further includes two current detection pins Ip and Im, a voltage detection pin VBAT, and a power pin VDD. The current detection pins Im and Ip are electrically connected to the current detection unit 16. The voltage detection pin VBAT is electrically connected to the voltage detection unit 19 and the switch 162. The power pin VDD is electrically connected to the filter capacitor C2, the FET Q and the sampling resistor Rsns.

The transistor T can be a pnp transistor and includes an emitter E, a base B, and a collector C. The emitter E of the transistor T is electrically connected to the battery charger 200 to receive electrical energy therefrom. The base B of the transistor T is electrically connected to the current control unit 14 through the current regulating resistor Rb, and the collector C is electrically connected to one end of the sampling resistor Rsns.

The current regulating resistor Rb is capable of regulating the current through the base B of the transistor T. The sampling resistor Rsns is capable of converting current signals into corresponding voltage signals to measure current values. In this exemplary embodiment, the resistance of the current regulating resistor Rb is about 390Ω, and resistance of the sampling resistor Rsns is about 0.1Ω.

The filter capacitors C1 and C2 are used for filtering noise signals. One end of the filter capacitor C1 is electrically connected between the emitter E of the transistor T and the charge detection unit 12, and the other end of the filter C1 is electrically connected to ground. The filter resistor R is electrically connected to the filter capacitor C1 in parallel, and one end of the filter resistor R is electrically connected between the emitter E and the charge detection unit 12, the other end of the filter resistor R is electrically connected to ground. One end of the filter capacitor C2 is electrically connected to the other end of the sampling resistor Rsns, and the other end of the filter capacitor C2 is electrically connected to ground.

The FET Q can be a p-channel enhancement-type FET, and includes a source S, a gate G, and a drain D. The source S is electrically connected to the filter capacitor C2 and the current detection unit 16, and connected to the collector C through the sampling resistor Rsns. The gate G is electrically connected to the charge control unit 18, and the drain D is electrically connected to the battery 300 and the voltage detection unit 19.

The charge detection unit 12 can detect and determine whether the battery charger 200 is connected to the electronic device. In this exemplary embodiment, for example, when the charge detection unit 12 detects current or voltage signals from the battery charger 200, the main controller 10 charges the battery 300 normally.

The current control unit 14 provides and transmits current signals to the base B of the transistor T through the current regulating resistor Rb to control the transistor T. For example, when the current control unit 14 transmits low current signals, such as logic 0, to the transistor T, the transistor T is switched on. The two current detection pins Ip and Im are electrically connected to two ends of the sampling resistor Rsns, so the current detection unit 16 detects the current through the sampling resistor Rsns, and transmits the detected current signals to the current control unit 14 to control and regulate the value of the current through the base B of the transistor T.

The power pin VDD is electrically connected to the sampling resistor Rsns and the filter capacitor C2, and receives electrical energy to power the main controller 10 and activate the built-in boot program. In this exemplary embodiment, the threshold power voltage of the main controller 10 is 2.6V.

The charge control unit 18 is electrically connected to the gate G of the FET Q to send a command signal, such as a pulse signal, to the gate G to switch the FET Q on or off. The voltage detection pin VBAT is electrically connected to the battery 300 and the drain D of the FET Q, and further electrically connected to the current detection pin Ip through the switch 162 to charge the battery 300.

The voltage detection unit 19 is electrically connected to the switch 162, the battery 300 and the charge control unit 18.

The voltage detection unit 19 is capable of detecting the voltage of the battery 300 in real time and controlling the charge control unit 18 according to the detection result. For example, when the voltage detection unit 19 determines the voltage of the battery 300 is below a threshold operating voltage, such as 3.2V, of the battery 300, the voltage detection unit 19 sends a command signal to the charge control unit 18 to switch the FET Q off. Thus, the current along the arrow A flows through the battery charger 200, the transistor T, the current detection pin Ip, the switch 162 and the battery 300 to form a first charging path to charge the battery 300. When the voltage of the battery 300 equals or exceeds the threshold operating voltage, the switch 162 is switched off by the voltage detection unit 19, cutting off the first charging path, and the voltage detection unit 19 sends a command signal to the charge control unit 18 to turn on the FET Q. Thus, the current along arrow B flows through the battery charger 200, the transistor T, the sampling resistor Rsns, the FET Q and the battery 300 to form a second charging path to charge the battery 300.

Figure 2:
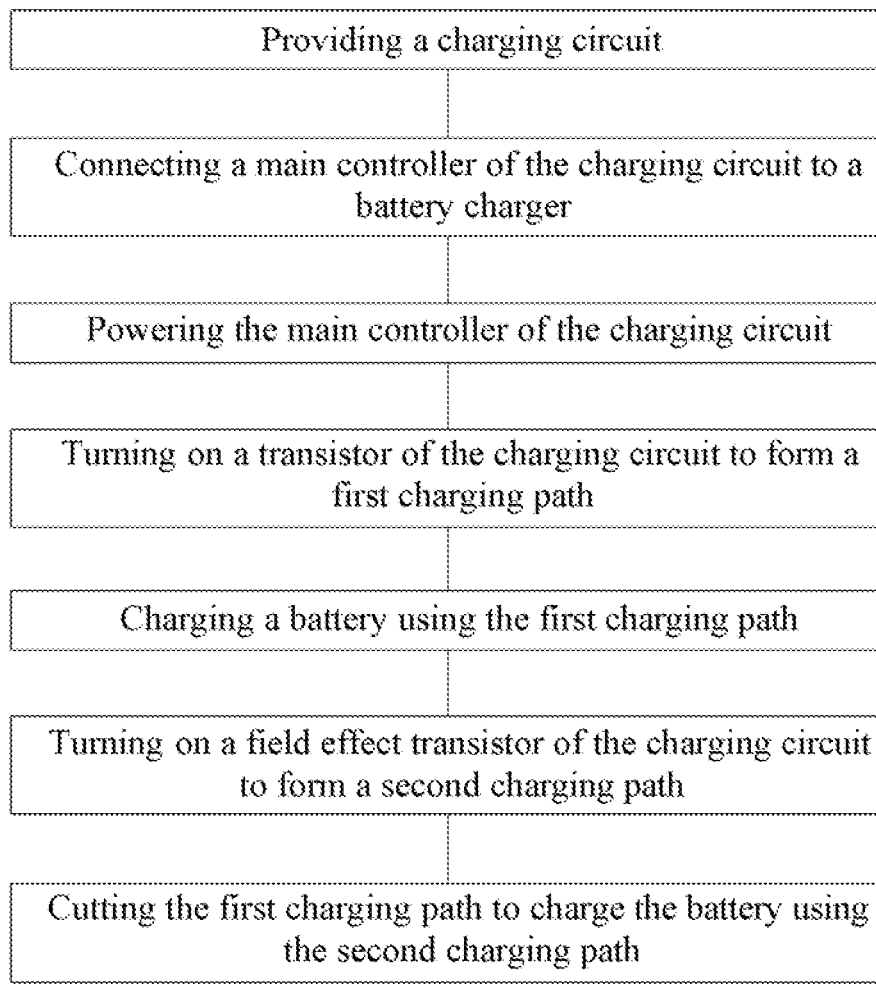
FIG. 2 is a flowchart of a charging method, according to an exemplary embodiment of the disclosure.

Further referring to FIGS. 1 and 2, in use, the battery 300 connects the battery charger 200 through the charging circuit 100, since the transistor T is switched off, and the main controller 10 is powered on, so that the electronic device can be powered on and activated normally. The current control unit 14 then provides and transmits a low current signal, such as logic 0, to the base B of the transistor T, such that the transistor T is switched on under the control of the low current signal. The current detection unit 16 detects and processes the current through the sampling resistor Rsns, and transmits the detected current signals to the current control unit 14 to control and regulate the current of the base B of the transistor T, until the current value of the collector C of the transistor T increases to a stable value, such as 500 mA.

Since the voltage of the battery 300 is below its threshold operating voltage, such as 3.2V, the FET Q is switched off, and the switch 162 is switched on, therefore, the battery 300 is charged through the first charging path. When the voltage detection unit 19 determines the voltage of the battery 300 equals or exceeds its threshold operating voltage, the voltage detection unit 19 then outputs and transmits a command signal to the switch 162 to turn off the switch 162, and the first charging path is cut off. The voltage detection unit 19 sends and outputs a command signal to the charge control unit 18 to switch the FET Q on. Thus, the battery 300 is charged through the second charging path, and the current from the collector C of the transistor T is amplified by the FET Q, and the amplified current is transmitted to the battery 300 to improve charging speed.

In summary, in the charging circuit 100 of this exemplary embodiment, the battery 300 can be charged normally through two different charging paths. Additionally, when the battery charger 200 is electrically connected to and charges the battery 300, the electronic device can boot normally in initial stages of charging despite limited availability of electrical energy, meeting needs of users.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A charging circuit electrically connected between a battery charger and a battery, comprising:
   a transistor comprising an emitter, a base and a collector, the emitter electrically connected to the battery charger;
   a current regulating resistor electrically connected to the base of the transistor;
   a field effect transistor comprising a source, a gate and a drain, the source electrically connected to the collector of the transistor, the drain electrically connected to the battery; and
   a main controller that electrically connects the collector of the transistor to receive electrical energy, the main controller comprising:
     a current control unit that electrically connects the base of the transistor through the current regulating resistor;
     a charge control unit that electrically connects the gate of the field effect transistor; and
     a voltage detection unit that electrically connects the charge control unit, the drain of the field effect transistor and the battery, wherein the current control unit transmits current signals to the base of the transistor to turn on the transistor and regulate the current values of the collector, the voltage detection unit detects the voltage of the battery to controls the charge control unit accordingly, and the charge control unit sends a command signal to the gate to switch the field effect transistor on or off.

2. The charging circuit as claimed in claim 1, further comprising a sampling resistor electrically connected between the collector of the transistor and the source of the field effect transistor, wherein the sampling resistor is capable of converting current signals to corresponding voltage signals.

3. The charging circuit as claimed in claim 2, wherein the main controller further comprises two current detection pins and a current detection unit, the current detection unit is electrically connected to the two current detection pins and the current control unit, the two current detection pins are electrically connected to two ends of the sampling resistor, the current detection unit detects the current through the sampling resistor, and transmits the detected current signals to the current control unit to control and regulate the value of the current through the base of the transistor.

4. The charging circuit as claimed in claim 3, wherein the main controller further comprises a voltage detection pin and a switch, the voltage detection unit is electrically connected to the voltage detection pin and the switch, the switch is electrically connected to the collector of the transistor through one of the current detection pins, and the voltage detection pin is electrically connected to the drain of the field effect transistor and the switch.

5. The charging circuit as claimed in claim 4, wherein when the voltage detection unit determines the voltage of the battery is below a threshold operating voltage of the battery, the voltage detection unit sends a command signal to the charge control unit to switch the field effect transistor off, and a first charging path is formed by the battery charger, the transistor, the current detection pin, the switch and the battery to charge the battery.

6. The charging circuit as claimed in claim 5, wherein when the voltage of the battery equals or exceeds the threshold operating voltage of the battery, the switch is switched off controlled by the voltage detection unit, the first charging path is cut off, and the voltage detection unit sends a command signal to the charge control unit to turn on the field effect transistor, and a second charging path is formed by the battery charger, the transistor, the sampling resistor, the field effect transistor and the battery to charge the battery.

7. The charging circuit as claimed in claim 1, further comprising a charge detection unit electrically connected to the battery charger and the emitter of the transistor, wherein the charge detection unit detects current or voltage signals from the battery charger to make the main controller to charge the battery.

8. The charging circuit as claimed in claim 7, further comprising a first filter capacitor and a filter resistor, wherein the first filter capacitor is capable of filtering noise signals, one end of the first filter capacitor is electrically connected between the emitter of the transistor and the charge detection unit, and the other end of the first filter is electrically connected to ground, and the filter resistor is electrically connected to the filter capacitor in parallel, and one end of the filter resistor is electrically connected between the emitter and the charge detection unit, the other end of the filter resistor is electrically connected to ground.

9. The charging circuit as claimed in claim 8, further comprising a second filter capacitor, wherein the second filter capacitor filters noise signals, one end of the second filter capacitor is electrically connected between the collector of the transistor and the source of the field effect transistor, and the other end of the second filter capacitor is electrically connected to ground.

10. The charging circuit as claimed in claim 1, wherein the transistor is a pnp transistor, the field effect transistor is a p-channel enhancement-type field effect transistor.

11. A charging circuit, comprising:
   a transistor comprising an emitter, a base and a collector, the emitter electrically connected to a battery charger;
   a current regulating resistor electrically connected to the base of the transistor;
   a field effect transistor comprising a source, a gate and a drain, the source connected to the collector of the transistor, the drain electrically connected to a battery; and
   a main controller that electrically connects the collector of the transistor to receive electrical energy, the main controller comprising:
      a current control unit that electrically connects the base of the transistor through the current regulating resistor;
      a charge control unit that electrically connects the gate of the field effect transistor;
      a voltage detection unit that electrically connects the charge control unit, the drain of the field effect transistor and the battery; and
      a switch that electrically connects the battery, the voltage detection unit and the collector of the transistor, wherein the current control unit provides and transmits a low current signal to the base of the transistor to the turn on the transistor and regulate the current value of the collector, when the switch is turned off controlled by the voltage detection unit, a first charging path is formed by the battery charger, the transistor, the switch and the battery to charge the battery; when the switch is turned on controlled by the voltage detection unit, a second charging path is formed by the battery charger, the transistor, the field effect transistor and the battery to charge the battery.

12. The charging circuit as claimed in claim 11, further comprising a sampling resistor electrically connected between the collector of the transistor and the source of the field effect transistor, wherein the sampling resistor is capable of converting current signals to corresponding voltage signals.

13. The charging circuit as claimed in claim 12, wherein the main controller further comprises two current detection pins and a current detection unit, the current detection unit is electrically connected to the two current detection pins and the current control unit, the two current detection pins are electrically connected to two ends of the sampling resistor, the current detection unit detects the current through the sampling resistor, and transmits the detected current signals to the current control unit to regulate the current value of the base of the transistor.

14. The charging circuit as claimed in claim 13, wherein the main controller further comprises a voltage detection pin, the voltage detection unit is electrically connected to the voltage detection pin, the switch is electrically connected to the collector of the transistor through one of the current detection pins, and the voltage detection pin is electrically connected to the drain of the field effect transistor and the switch.

15. The charging circuit as claimed in claim 14, wherein when the voltage detection unit determines the voltage of the battery is below a threshold operating voltage of the battery, the voltage detection unit sends a command signal to the charge control unit to switch the field effect transistor off, the first charging path is enabled to charge the battery.

16. The charging circuit as claimed in claim 15, wherein when the voltage of the battery equals or exceeds the threshold operating voltage of the battery, the switch is switched off controlled by the voltage detection unit, the first charging path is cut off, and the voltage detection unit sends a command signal to the charge control unit to turn on the field effect transistor, and the second charging path is activated to charge the battery.

17. The charging circuit as claimed in claim 11, further comprising a charge detection unit electrically connected to the battery charger and the emitter of the transistor, wherein the charge detection unit detects current or voltage signals from the battery charger to make the main controller to charge the battery.

18. The charging circuit as claimed in claim 17, further comprising a first filter capacitor, a second filter capacitor and a filter resistor, wherein one end of the first filter capacitor is electrically connected between the emitter and the charge detection unit, and the other end of the first filter is electrically connected to ground, the filter resistor is electrically connected to the filter capacitor in parallel, one end of the filter resistor is electrically connected between the emitter and the charge detection unit, the other end of the filter resistor is electrically connected to ground, and one end of the second filter capacitor is electrically connected between the collector of the transistor and the source of the field effect transistor, and the other end of the second filter capacitor is electrically connected to ground.

19. A charging method for charging a battery using a battery charger, the charging method comprising steps of:
   providing a charging circuit that comprising a main controller, a transistor, and a field effect transistor, the main controller comprising a current control unit, a charge control unit, a voltage detection unit, and a switch;
   connecting the charging circuit to the battery charger;
   powering the main controller of the charging circuit;
   turning on the transistor under the control of the current control unit and turning on the switch under the control of the voltage detection unit to form a first charging path formed by the battery charger, the transistor, the switch, and the battery;
   charging the battery using the first charging path;
   turning on the field effect transistor controlled by the charge control unit and turning off the switch under the control of the voltage detection unit to form a second charging path formed by the battery charger, the transistor, the field effect transistor and the battery; and cutting the first charging path to charge the battery using a second charging path.

20. The charging method as claimed in claim 19, wherein the charging circuit further comprises a current regulating resistor, the transistor comprises an emitter, a base, and a collector, the emitter is electrically connected to the battery charger; the base of the transistor is electrically connected to the current regulating resistor; the field effect transistor comprises a source, a gate, and a drain, the source is connected to the collector of the transistor, the drain electrically is connected to the battery; the current control unit electrically connects the base of the transistor through the current regulating resistor, the charge control unit electrically connects the gate of the field effect transistor; the voltage detection unit electrically connects the charge control unit, the drain of the field effect transistor, and the battery; the switch electrically connects the battery, the voltage detection unit, and the collector of the transistor.

* * * * *